United States Patent [19]
Ganiaris

[11] 3,824,799
[45] July 23, 1974

[54] WASH OF ICE CRYSTALS
[75] Inventor: Neophytos Ganiaris, Riverdale, N.Y.
[73] Assignee: Struthers Patent Corporation
[22] Filed: Apr. 30, 1973
[21] Appl. No.: 355,688

[30] Foreign Application Priority Data
May 1, 1972  Great Britain............... 020156/72

[52] U.S. Cl. ................................................ 62/123
[51] Int. Cl. ............................................. B01d 9/04
[58] Field of Search......................... 62/58, 123, 124

[56] References Cited
UNITED STATES PATENTS
3,019,611  2/1962  Toulmin, Jr. ..................... 62/123 X
3,069,864  12/1962  Crosby................................... 62/58

Primary Examiner—Meyer Perlin
Assistant Examiner—Ronald C. Capossela

[57] ABSTRACT

Ice crystals formed in a solution, such as in the ice crystallization conversion of sea water to fresh water, are washed in organic liquid, such as Freon, at a temperature below 32° F. The ice crystals float upward in the Freon to be restrained by an upward sloping screen. The ice crystals are agitated in the liquid Freon by vibration of the screen and/or by jets of liquid Freon directed downward through the screen. Brine, which is thus mechanically washed from the crystals, floats upward through the screen to be collected above it. Washed ice crystals move up the screen to be collected, melted, and have the Freon separated from the fresh melt water.

10 Claims, 2 Drawing Figures

PATENTED JUL 23 1974
3,824,799

WASH OF ICE CRYSTALS

BACKGROUND OF THE INVENTION

Ice crystals formed in solution, as in the freeze conversion of sea water into fresh water or slush freeze concentration of beverages such as tea, coffee or citrus juice, are conventionally washed by fresh water using a number of different methods. All water washing of ice crystals requires fresh wash water amount to 5 to 15 per cent by weight of the ice crystals recovered under the best circumstances. In addition, a considerable weight of the coated ice crystals may be melted during their water washing as the wash water must be over 32° F. The organic solvent of ice crystals according to this invention is more efficient and economical.

DESCRIPTION OF THE PREFERRED EMBODIMENTS

Figures 1, 2:
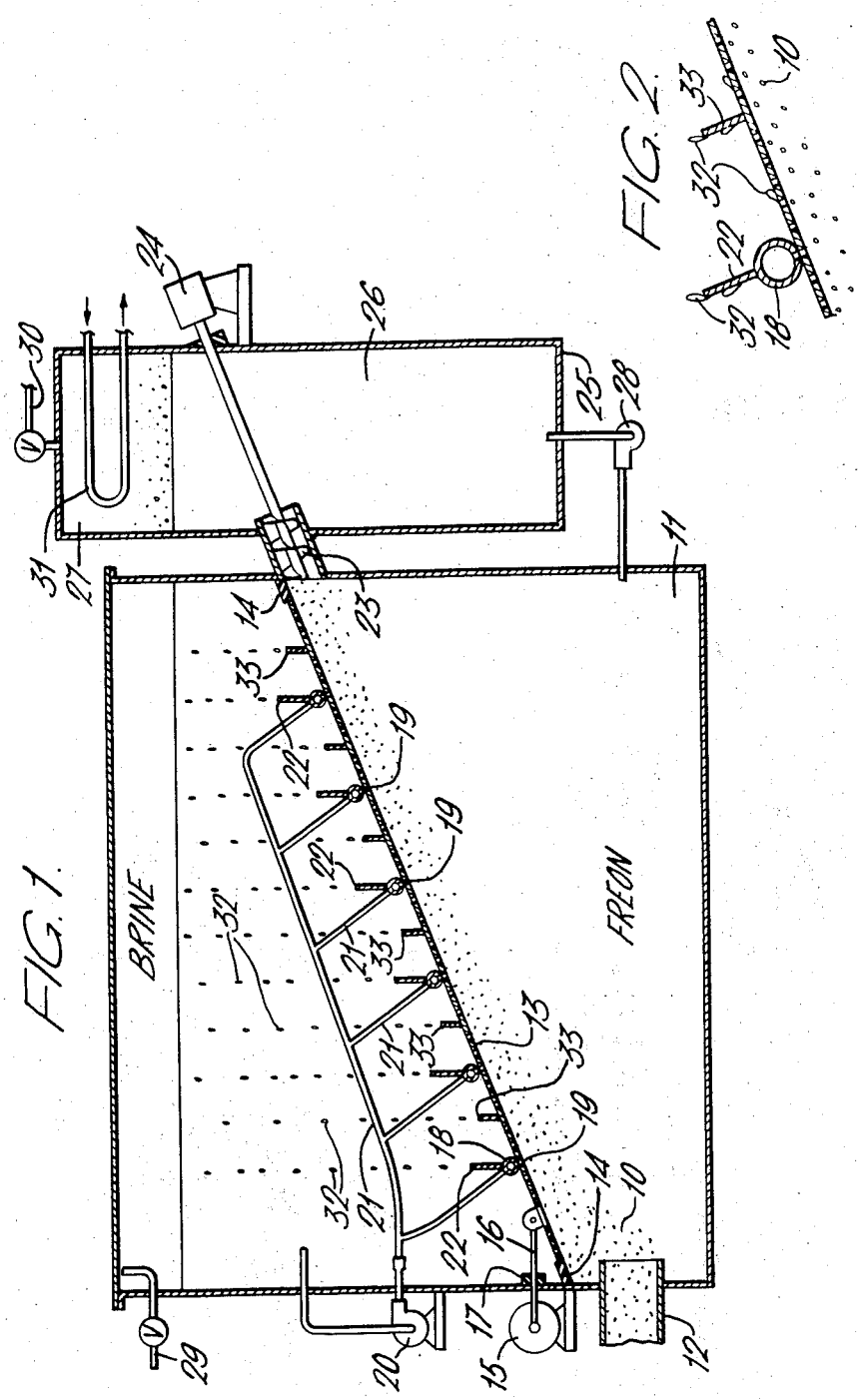
FIG. 1 is a longitudinal, vertical section through a wash tank and an ice crystal melt tank according to this invention.
FIG. 2 is a section through a fragment of a perforated screen with ice crystals floating up thereunder.

As shown in FIG. 1, a water solution and ice slurry 10 enters tank 11 through duct 12 propelled by any suitable conveyor (not shown). Tank 11 is rectangular and contains an upward sloping screen 13 which may be a sheet of perforated metal, expanded metal, woven mesh, or the like. Screen 13 is mounted in a resilient frame 14 of rubber or the like so that the vibrator 15 may be connected to it by means of the push rod 16 which enters tank 11 through seal 17.

Transverse tubes 18 containing downward facing jets 19 are welded or otherwise fixed to the top of screen 13. Pump 20 draws Freon from tank 11 and passes it through flexible tubes 21 to each transverse tube 18. Transverse drip baffles 22 extend up from each tube 18 and drip baffles 33 extend up from the stop of screen 13. Screen 13, tubes 18, baffles 22 and baffles 33 may be fabricated from metal and welded together. Tubes 21 may be of vinyl or other flexible material. A screw 23 or the like driven by motor 24 draws washed ice crystals 10 into the melt and Freon separation tank 25.

This apparatus is used in the following manner. Ice crystals 10 are injected into the liquid Freon to float upward against the screen 13 which is agitated by vibrator 15 in its resilient frame 14. Alternately or in addition, the agitation of the ice crystals may be accomplished by jets 19 of Freon pumped down through screen 13. The mechanical agitation of the crystals in liquid Freon removes solute from their surfaces. This removed solute, brine and any other brine introduced with the crystals floats upward through screen 13 to form drops 32 which rise to collect in the top of tank 11. The Freon in tank 11 is best kept above the freezing temperature of the brine or solution which is usually about 26° to 27° F. in the freeze conversion of water solutions and below the 32° F. melting temperature of the ice crystals. During the washing of ice crystals below screen 13, some surface ice will melt on each crystals to achieve equilibrium, but the ice lost during Freon washing will be minimal compared to the losses during conventional water washing.

Many Freon refrigerants or other organic liquids may be used. For example, Freon 318 would be excellent from an engineering point of view. It boils at 21.5° F. at atmospheric pressure and thus would have to be used under a slight vacuum. However, Freon 318 is relatively expensive and it is not desirable to operate the crystal washing apparatus at a pressure or under a vacuum if this can be avoided. Pressure apparatus is costly and vacuum apparatus can leak air into the system.

The best solution, which is a main feature of this invention, is to use a mixture of Freon 114 and Freon 12 in a proportion of about 80:20 which provides a boiling point in the desired temperature range. This proportion may be varied between 60:40 and 90:10. While Freon 114 could be cooled below its boiling point and used as a wash liquid for ice crystals, the ice crystals washed in this invention will be produced in a direct contact crystallizer (not shown) which would preferably use the same Freon as the crystal washer. Thus it is best to control the temperature in the washer by its pressure. This allows the Freon mixture in the crystallizer to be expanded through a valve from the crystallizer at low pressure to atmospheric pressure in tanks 11 and 25. For this purpose the mixture, as set forth above, is the best solution when using liquid Freon to wash ice crystals. A further advantage results from the fact that Freon 12 forms hydrates when used alone. The mixture of Freon 114 and Freon 12 will not form hydrates.

Washed crystals 10 below the upper end of screen 13 are removed by screw conveyor 23 into tank 25. Any conventional means, such as heat exchanger coils 31, are used to melt ice to water 27 which separates from an liquid Freon 26 carried into tank 25 on the crystals. Pump 28 returns separated Freon to tank 11. Brine or solution is drawn off through pipe 29 and fresh water through pipe 30. Final stripping of Freon from the fresh water and the brine or solution of beverage product is carried out elsewhere under a vacuum.

FIG. 2 shows a detail of screen 13 against which ice crystals 10 are floated in Freon. The drip baffles 22 and 33 prevent drops 32 of brine or solution from running upward along on the top surface of screen 13.

In summary, the process of this invention mechanically washes brine or beverage solution covered ice crystals in an organic liquid mixture (preferably Freon 114 and Freon 12 between proportions of 60:40 and 90:10) at substantially atmospheric pressure and a temperature below 32° F. and above the freezing temperature of the brine or solution. This more effectively removes adhering solute with less crystal melting and with no use of fresh wash water.

What is claimed is:

1. Apparatus for washing ice crystals comprising, in combination,
   a. a wash tank containing Freon,
   b. an inclined screen in said tank,
   c. means introducing ice crystals to be washed under a lower portion of said screen,
   d. means agitating ice crystals floating upward in Freon against said screen working ice crystals upward under said screen to a higher portion of said screen, the agitation of the ice crystals washing solute therefrom to pass upward through said screen and float to the top of said tank,
   e. means removing washed ice crystals from under an upper portion of said screen, and
   f. means removing solute from the stop of said tank.

2. The combination according to claim 1 wherein said ice crystals are in a brine slurry, brine being washed from said ice crystals.

3. The combination according to claim 2 with the addition of transverse drip baffles extending upward from said screen.

4. The combination according to claim 2 wherein said tank contains Freon 318.

5. The combination according to claim 2 wherein said tank contains a mixture of Freon 114 and Freon 12 in proportions by weight varying between 60:40 and 90:10.

6. The combination according to claim 5 wherein said mixture of Freon is below 32° F.

7. The combination according to claim 2 wherein said tank contains a mixture of Freon 114 and Freon 12 in a proportion by weight of substantially 80:20.

8. The combination according to claim 2 wherein said screen is resiliently mounted and wherein said means agitating ice crystals is a vibrator connected to said screen vibrating said screen and thereby agitating said ice crystals.

9. The combination according to claim 2 wherein said means agitating said ice crystals comprises means directing jets of Freon downward below said screen to agitate said ice crystals.

10. The combination according to claim 9 wherein said screen is resiliently mounted and with the addition of a vibrator connected to said screen vibrating said screen to additionally agitate said ice crystals.

* * * * *